Jan. 29, 1935. C. L. LEE 1,989,323
CASH REGISTER
Filed Feb. 7, 1930 5 Sheets-Sheet 1

Inventor
Charles L. Lee
By
Uearl Beust
His Attorney

Jan. 29, 1935.  C. L. LEE  1,989,323
CASH REGISTER
Filed Feb. 7, 1930   5 Sheets-Sheet 2
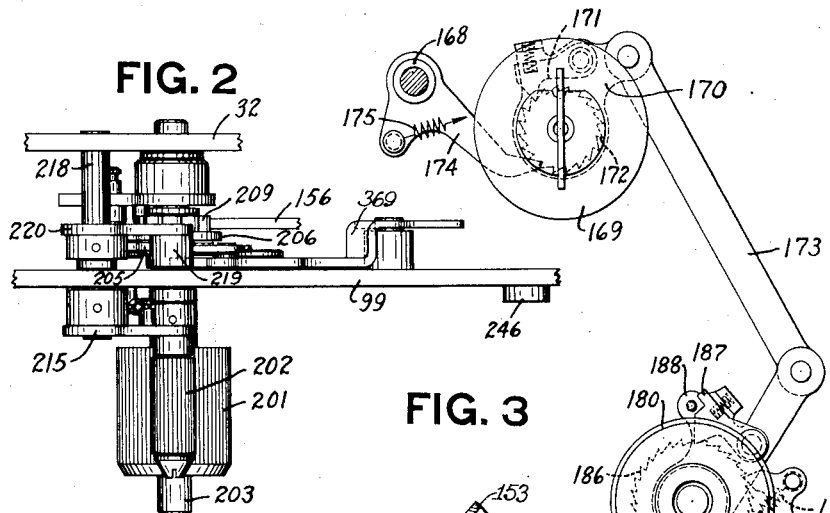
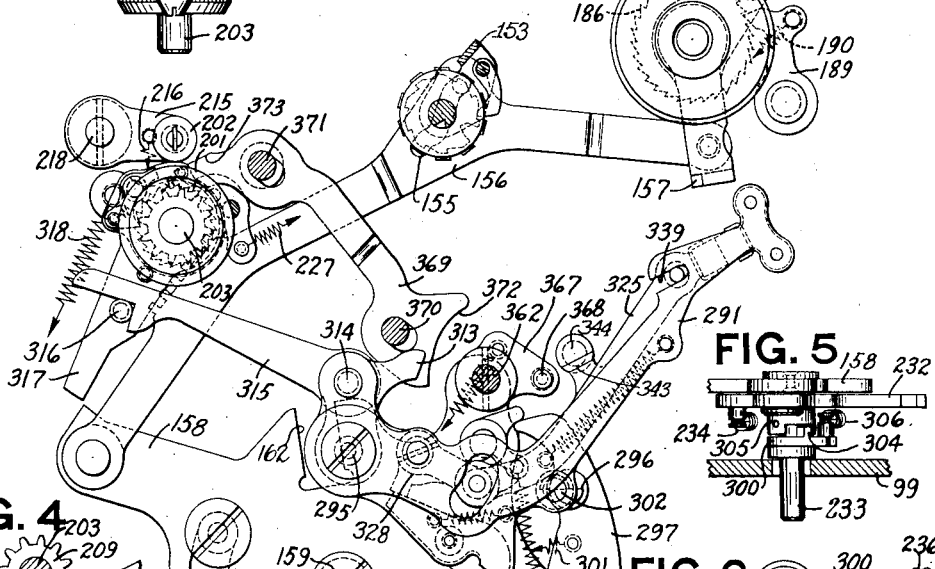
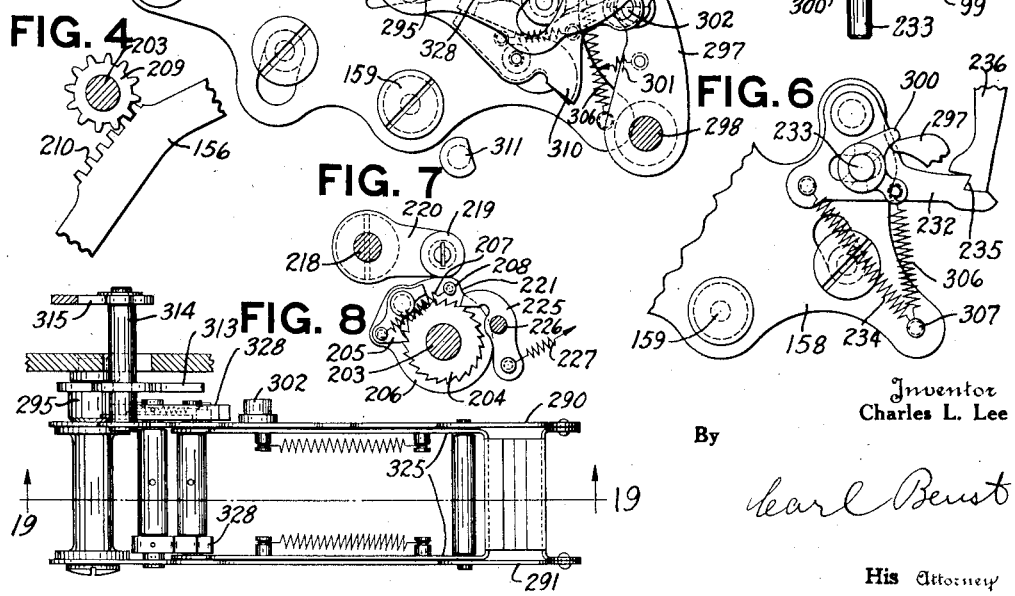
Inventor
Charles L. Lee
By
Pearl Benst
His Attorney Jan. 29, 1935.  C. L. LEE  1,989,323
CASH REGISTER
Filed Feb. 7, 1930  5 Sheets-Sheet 3
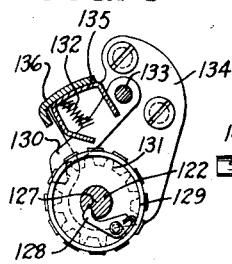
FIG. 9
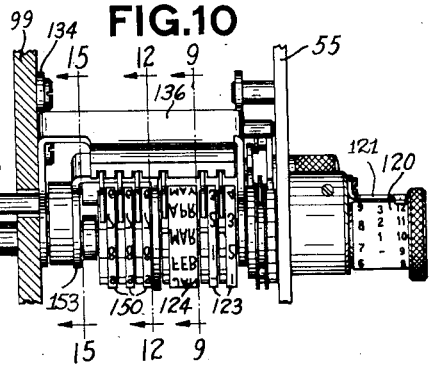
FIG. 10
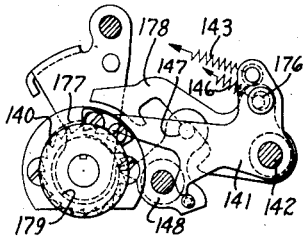
FIG. 11
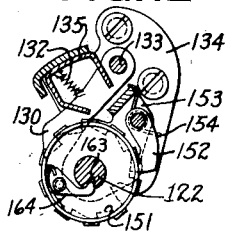
FIG. 12
FIG. 13
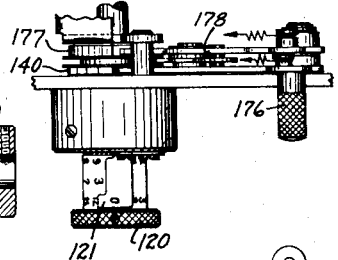
FIG. 14
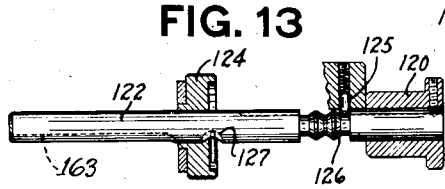
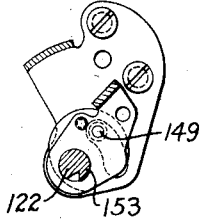
FIG. 15
FIG. 16
FIG. 17
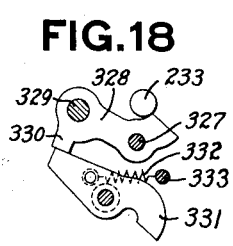
FIG. 18
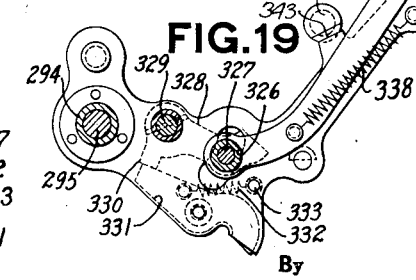
FIG. 19
Inventor
Charles L. Lee
By
Earl Berst
His Attorney

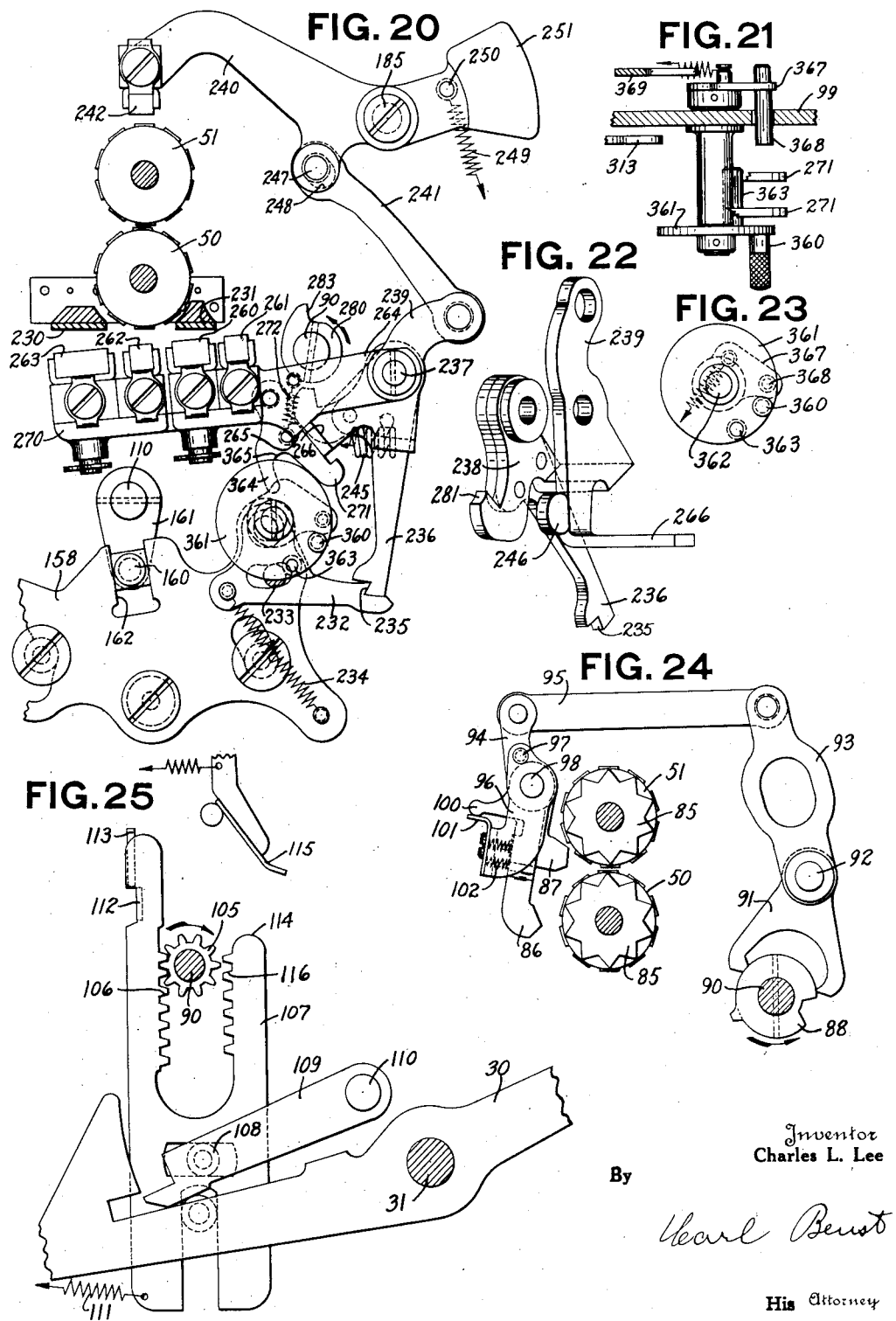

Jan. 29, 1935.  C. L. LEE  1,989,323
CASH REGISTER
Filed Feb. 7, 1930  5 Sheets-Sheet 5
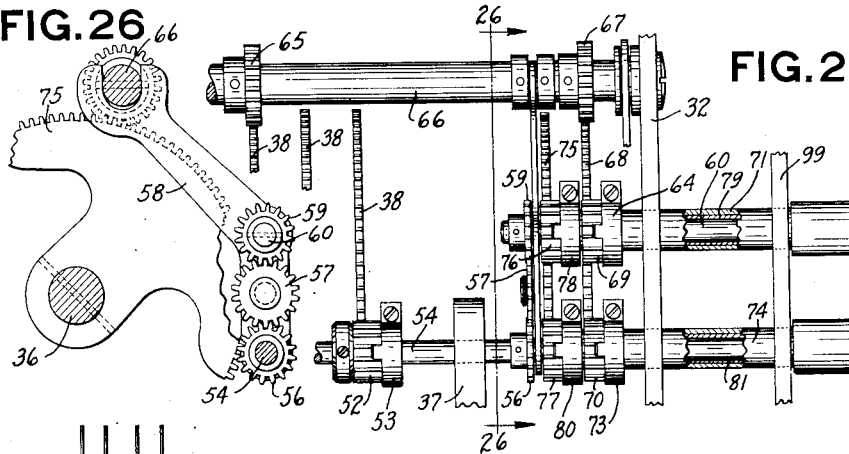
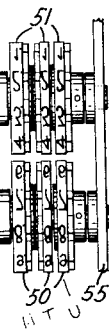
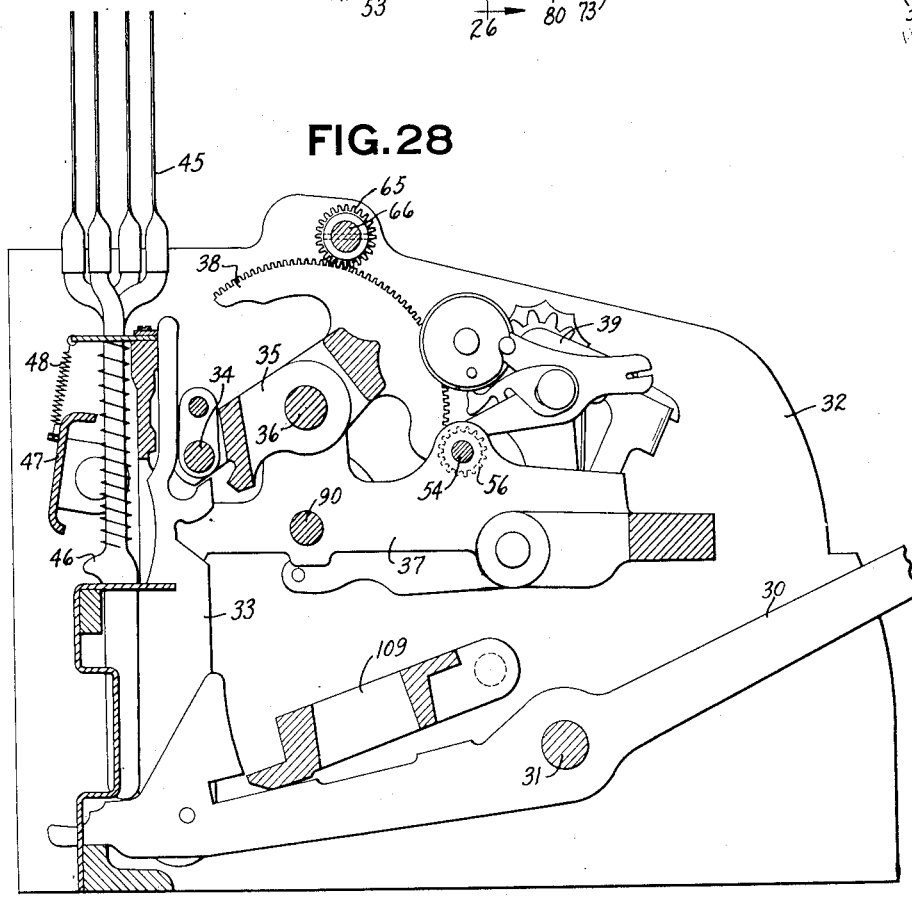
Inventor
Charles L. Lee
By Earl Benst
His Attorney Patented Jan. 29, 1935

1,989,323

UNITED STATES PATENT OFFICE 1,989,323

CASH REGISTER

Charles L. Lee, Dayton, Ohio, assignor to The National Cash Register Company, Dayton, Ohio, a corporation of Maryland Application February 7, 1930, Serial No. 426,685

25 Claims. (Cl. 235—3)

This invention relates to improvements in cash registers and like machines, and more particularly to machines of the type shown and described in Letters Patent of the United States to Carney, No. 497,860, granted May 23, 1893, and No. 683,877, granted October 1, 1901.

One object of this invention is to provide a key operated machine which will print and issue a receipt by the depression of the amount keys without overloading the keys.

Another object is to provide a mechanism for automatically locking the amount keys against operation until after the receipt has been removed from the machine.

A further object is to provide means to release the keys for operation by the operation of removing the receipt.

These objects enforce the desired sequence of operation of the machine, so that one unfamiliar with this machine is prevented from making errors.

To this end, I have contrived a machine which, when the operator depresses the key representing the amount of a purchase, will eject the free end of a strip of paper on which the receipt is printed.

The second object then becomes effective automatically and the keys are locked against further operation until the operator grasps the projecting edge of the receipt and withdraws it from the machine.

In so doing, the third object of the invention becomes effective and releases the locking mechanism for the amount keys, thereby preparing the machine for the entry of the next purchase.

The receipt paper is drawn out of the machine by the operator until a predetermined length has issued, whereupon the paper is arrested. The resistance to further paying out of the paper strip notifies the operator that a sufficient length has been withdrawn, whereupon he tears the projecting portion from the supply, against a convenient cutting edge.

As one means to obtain the measured feed of the paper strip and the release of the key locking means, I have provided a means adapted to grip the paper strip at a predetermined distance from the cutting edge, which paper gripping means is connected with the means to release the key locking means.

The paper gripping means advances towards the cutting edge as the paper is drawn out until the gripping means contacts a suitable arresting device, whereupon it opposes resistance to the continued withdrawal of the paper strip.

The paper gripping means as it contacts its arresting means to resist further withdrawal of the paper, operates through its connections to release the amount keys for operation.

Upon the severance of the protruding portion of the paper strip from the supply and subsequent operation of an amount key, the paper gripping means returns to its normal position but before so doing releases its grip on the paper.

When the paper gripping means is arrested on its return to normal, it immediately renews its grip upon the paper strip.

A further object is to provide a means which is adapted to grip the receipt paper and to be operated thereby when the receipt is removed from the machine for unlocking the amount keys after the receipt has been removed.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a detail top plan view of the receipt paper feeding mechanism and the throw-out mechanism which co-operates therewith.

Fig. 3 is a detail view of the receipt paper feeding mechanism, the detail paper feeding mechanism, and the means for locking the machine until after the receipt has been removed.

Fig. 4 is a fragmentary detail view in side elevation of a part of the receipt printing mechanism.

Fig. 5 is a detail top plan view of a part of the printing hammer operating mechanism, and a part of the means for tripping the locking mechanism of the amount keys.

Fig. 6 is a detail view in side elevation of the same.

Fig. 7 is a detail view of a part of the receipt paper feeding mechanism, and the means for controlling the tension roller thereof.

Fig. 8 is a detail top plan view of the rocking frame and gripping device which is adapted to be actuated, when the receipt is removed from the machine, to unlock the amount keys.

Fig. 9 is a detail view of the month type wheel, together with its retaining pawl, taken on line 9—9 of Fig. 10, looking in the direction of the arrows.

Fig. 10 is a front view of the consecutive number printing and date printing type carriers and their setting mechanisms.

Fig. 11 is a right side elevation of the date type carrier setting device shown in Fig. 10.

Fig. 12 is a detail view of one of the consecutive numbering type carriers, taken on line 12—12 of Fig. 10, and looking in the direction of the arrows.

Fig. 13 is a detail view of the date setting and consecutive number turn-to-zero shaft.

Fig. 14 is a top plan view of the mechanism shown in Fig. 11.

Fig. 15 is a detail view of a part of the operating mechanism for the consecutive number printing device taken on line 15—15 of Fig. 10, looking in the direction of the arrows.

Fig. 16 is a detail view of a means to rock the amount key locking frame manually.

Fig. 17 is a facsimile of a receipt issued by the machine.

Fig. 18 is a fragmentary detail view in side elevation, of the latching mechanism for the receipt paper gripping device.

Fig. 19 is a detail view taken on line 19—19 and looking in the direction of the arrow in Fig. 8.

Fig. 20 is a detail side elevation of the receipt paper and detail paper printing mechanisms.

Fig. 21 is a top plan view of the "on" and "off" device to control the receipt issuing mechanism.

Fig. 22 is a detail perspective view of a part of the printing mechanism shown in Fig. 20.

Fig. 23 is a front elevation of the "on" and "off" device shown in Fig. 21.

Fig. 24 is a detail view of the type wheel aligning mechanism.

Fig. 25 is a detail view of the revolution rack mechanism, and shows the means for turning the main cam shaft of the machine through one complete revolution upon depression of an amount key.

Fig. 26 is a detail side view of a part of the amount type carrier setting mechanism, taken on line 26—26 of Fig. 27, and looking in the direction of the arrows.

Fig. 27 is a front elevation of part of the amount type carrier setting mechanism, and Fig. 28 is a cross section through the machine, and shows one of the amount keys and the differential mechanism operated thereby, for entering the amounts into the totalizer, together with the indicators therefor, parts being omitted for clearness.

General Description

Figure 1:
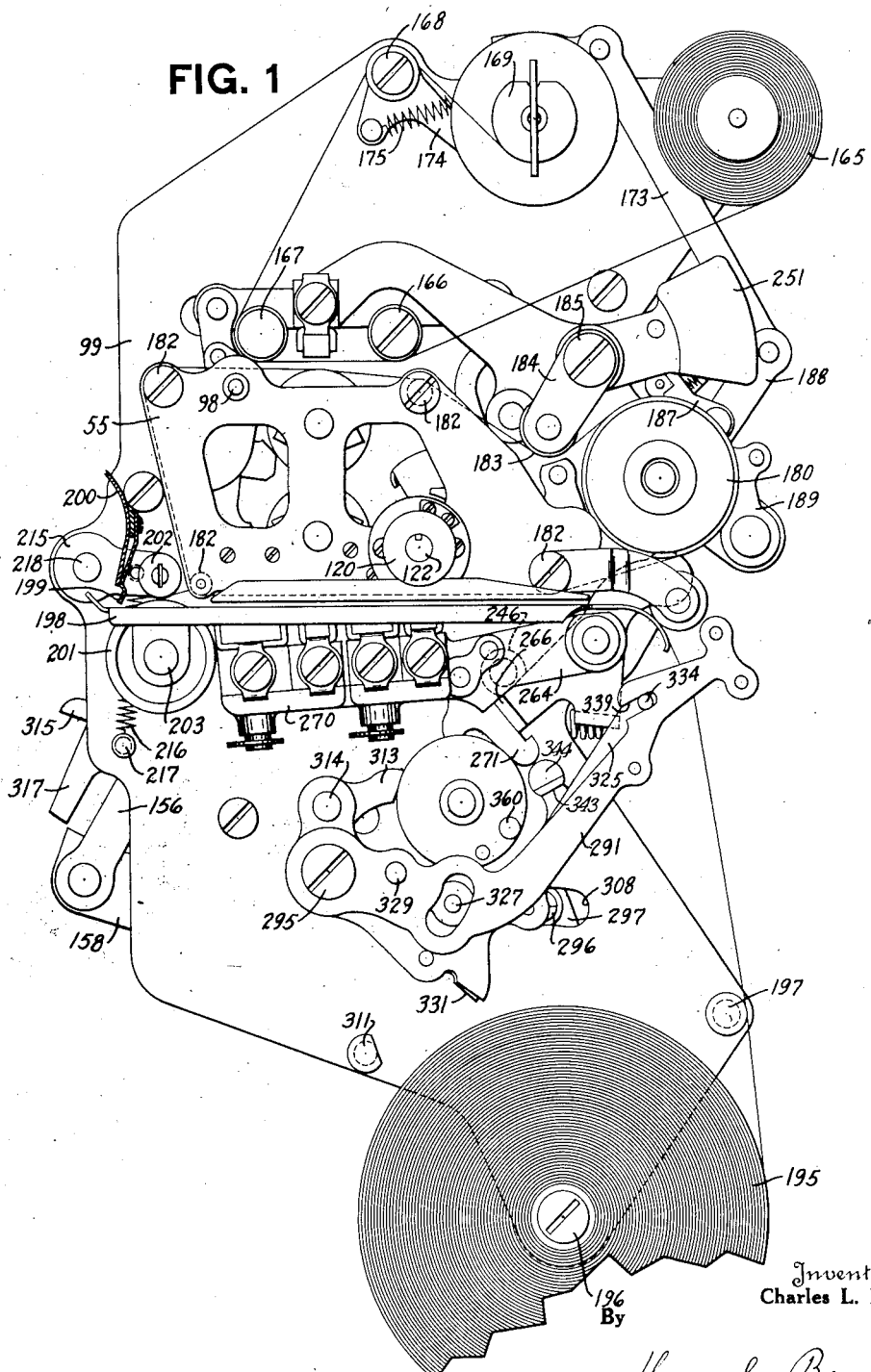
Fig. 1 is a righthand elevation of the printing mechansm for the machine.

The invention disclosed herein is conveniently shown applied to the well known Carney key-operated type of cash register, shown in the above-mentioned patents, and illustrates a receipt printing mechanism for key-operated machines of this class, wherein the entire mechanism is operated solely by depression of the amount keys. Thus, depression of an amount key not only enters the amount into the totalizer, but also operates the various printing devices.

The mechanism for printing and issuing the receipt disclosed herein is so constructed that a minimum load is placed upon the keys, thereby providing a receipt issuing mechanism without overloading the keys.

The mechanism for issuing the receipt, that is, for feeding the receipt out of the machine, is so constructed that it will feed only a part of the receipt through an opening in the cabinet. The balance of the receipt must then be manually pulled out of or withdrawn from the machine by the operator, before a second receipt can be printed. A locking device is provided for locking the amount keys against depression until the paper has been removed from the machine, that is, until the receipt has been entirely withdrawn from the machine.

The locking mechanism for the amount keys is controlled by means of a rocking frame upon which is mounted a pair of gripping members which are adapted to grip the receipt paper when the amount has been entered into the totalizer, and after the receipt has been printed and partially issued.

When the operator pulls the balance of the receipt out of the machine, the rocking frame, which is then gripping the receipt paper, advances therewith until a predetermined length of paper forming the receipt, is entirely removed from the machine. This movement of the rocking frame unlocks the amount keys so that another amount can be entered into the machine.

An "on" and "off" knob is provided for disabling the receipt printing and issuing mechanism, so that no receipt will be printed or issued. This device also disables the locking mechanism for the amount keys so that any number of successive amounts can be entered in the machine without first operating the rocking frame above mentioned.

Detailed Description

The machine to which the present invention is shown attached, being of the well known Carney type, requires only a very brief description. For a more detailed description, reference may be had to the above-mentioned Carney patents.

Differential mechanism

The machine is provided with a plurality of banks of amount keys 30 (Fig. 28) which are pivoted on a rod 31 carried by side frames 32, only one of which is shown herein. A differentially shaped lifting member 33 pivoted to the rear end of each amount key 30, is adapted to engage a transversely extending rod 34 carried by a rocking frame 35 upon depression of a key. The rocking frame 35 of which there is one for each denominational group of keys, is pivoted on a rod 36 carried by the side frames 32 of the machine and an auxiliary frame 37. An actuating segment 38 secured to each rocking frame 35 is adapted to mesh with its appropriate totalizer wheel to enter amounts into a totalizer 39 of the well known type shown and described in the above-mentioned Carney patents.

Any number of banks of keys 30 can be provided in the machine, and each bank is adapted to operate one of the frames 35. As illustrated herein, the machine is provided with three banks of keys, and therefore, three frames 35 are provided, one for each bank of amount keys. The lifting members 33 are so formed that the actuating segment 38 is differentially operated according to the value of the keys depressed.

Indicators

An indicator 45 is brought into view by its amount key, to display the amount corresponding to the values of the depressed keys and entered on the totalizer. Elevation of an indicator shifts a rearwardly projecting lug 46 formed thereon above a rocking channel member or latch 47 which holds the indicator in its elevated position.

A spring 48 holds the channel member 47 in and returns it to its normal effective position.

Type carriers

The machine is provided with two sets of amount type carriers, a set 50 (Fig. 27) for printing on the receipt and a set 51 for printing on the detail strip, which remains in the machine. As illustrated, the machine is provided with three banks of amount keys, and therefore, three type carriers 50 and 51 are shown herein, one for each bank of keys.

The method of setting the penny type carrier will be described first. The actuator segment 38 for the penny bank of keys meshes with a pinion 52 which is clutched to a collar 53, clamped to a shaft 54. The shaft 54 is carried by the before-mentioned auxiliary frame 37 and a printer plate 55 (Fig. 27). The penny type wheel is pinned to the shaft 54 and therefore when the penny actuator 38 is adjusted by depression of a penny amount key, the penny type carrier will be adjusted accordingly.

The penny type wheel for the detail strip is also adjusted by the penny actuating segment 38. Secured to the shaft 54 is a pinion 56 (Figs. 26 and 27) which meshes with an idler gear 57 carried by a bracket 58. The idler gear 57 meshes with a gear 59 secured to a shaft 60, upon which the penny type carrier 51 is secured.

From the above it is apparent that the differential movement of the penny actuating segment 38 will be transmitted to the penny wheels 50 and 51.

The dollars type carriers are adjusted by the actuator segment 38 of the dollars bank of keys by means of a train of mechanism which will now be described. Meshing with the dollars actuator 38 (Fig. 28) is a gear 65 secured to a shaft 66 carried by the side frames 32. (See also Fig. 27.) Also secured to the shaft 66 is a gear 67 which meshes with a segment 68 which is similar to the actuating segment 38. The segment 68 meshes with a pair of pinions 69 and 70, and is adapted to actuate them according to the value keys depressed. The pinion 69 is clutched to a collar 64 which is clamped to a sleeve 71, upon which the dollar type carrier 51 for the detail strip is secured.

The pinion 70 is clutched to a collar 73, which is clamped on a sleeve 74 upon which the dollar type wheel 50 for the receipt printing mechanism is secured. Hence it is seen that when a dollar key is depressed, the dollar type wheels, for both the detail strip and the check strip, are adjusted according to the value of the key depressed.

The dimes type carrier is adjusted by means of the dimes rocking frame 35 which is secured to the rod 36. Also secured to the rod 36 is a segment 75 which meshes with pinions 76 and 77. The pinion 76 is clutched to a collar 78 which is clamped to a sleeve 79 upon the other end of which is secured the dimes type carrier 51.

The pinion 77 is clutched to a collar 80 which is clamped to a sleeve 81 upon the other end of which is secured the dime type carrier 50. From the above it is seen that when a dimes amount key is depressed, the dimes type carriers 50 and 51 are adjusted accordingly, by means of the rocking frame 35, rod 36, segment 75 and the sleeves 81 and 79, respectively.

Type wheel aligning mechanism

A mechanism is provided for properly aligning the type carriers after they have been adjusted by means of the amount keys as just described and before the printing hammers are operated to take an impression therefrom.

Secured to the side of each type carrier is a ratchet wheel 85 (Fig. 24), which is adapted to be engaged by an aligning member 86 or 87. The aligning members 86 and 87 are rocked into engagement with the ratchet wheels 85 by means of a cam 88 on the main cam shaft 90. The main cam shaft 90 is given one complete rotation during each operation of the machine by means of mechanism to be presently described.

Co-operating with the main cam shaft 90 is an arm 91 pivoted on a stud 92. Secured to the arm 91 is an arm 93, which is connected to an arm 94 by means of a link 95. The arm 94 is secured to a frame 96 by means of a stud 97. The frame 96 is loosely mounted on a shaft 98 carried by the printer frame 55 (Fig. 1) before mentioned, and a printer frame 99. Each of the aligning members 86 and 87 are provided with forwardly extending portions 100 which are normally held in engagement with a flange 101, of a bracket secured to the frame 96, by means of springs 102.

When the cam 88 rocks the arm 91 in a counter-clockwise direction, the aligning members 86 and 87 are carried into engagement with the ratchet wheels 85. The movement given to the frame 96 is greater than the movement necessary for engaging the wheels 85 and therefore, upon continued movement of the frame 96 after the aligning members 86 and 87 engage the ratchet wheels 85, the springs 102 will be compressed thereby holding the aligning members 86 and 87 in resilient engagement with the ratchet wheels 85.

Main cam shaft operating mechanism

The mechanism for rotating the main cam shaft 90 is the type well known in the art, and shown and described in the above-mentioned Carney patents, and therefore, only a brief description will be given herein. Secured to the cam shaft 90 (Fig. 25) is a pinion 105 which is normally engaged by teeth 106 of a reciprocable double rack 107. The double rack 107 is engaged by a roller 108 carred by the key coupler 109 mounted on two stub shafts 110. The key coupler normally rests on the amount keys 30 and when any one of the amount keys is depressed, the key coupler is raised thereby raising the reciprocable double rack 107.

The teeth 106 of the double rack 107 are normally held in engagement with the pinion 105 by means of a spring 111, but during the up stroke of the rack, a flange 112 on the double rack 107 engages a flange 113 on the right side frame of the machine, thereby preventing this disengagement until the double rack reaches its uppermost position.

As the double rack 107 reaches its highest position, the portion 114 thereof, engages a spring-pressed pawl 115, and causes teeth 116 of the double rack 107 to engage the pinion 105, after the flange 112 passes the flange 113. The key coupler 109 is returned to its normal position by means of gravity aided by a spring (not shown herein), and therefore, when the double rack 107 is lowered by the key coupler, the pinion 105 is given an additional movement in the direction of the arrow. The up stroke of the double rack 107 is sufficient to rotate the cam shaft 90 one-half of a rotation, and the down stroke of the double rack 107 rotates the main cam shaft 90 an additional one-half rotation, thereby completing the rotation of the main cam shaft.

*Date printing type carrier adjusting devices*

The date printing device is like the device shown and described in the Letters Patent of the United States, No. 1,338,230, granted to the present inventor on April 27, 1920. Only a very brief description of this device is given herein, and reference may be had to this patent for a detailed description.

Three type carriers are provided, one for the months and two for the dates. All three of these type carriers are adjusted by means of a manipulative knob 120 (Figs. 10, 13 and 14) which is engraved with numerals corresponding to the three type characters. A pointer 121 is provided for aiding the operation in adjusting the knob 120.

The knob 120 is secured to a shaft 122 upon which the date type carriers 123 and the month type carriers 124 are loosely mounted. The shaft can be shifted lengthwise to three positions, and is held in any one of these positions by means of a spring-pressed aligning plunger 125 which is adapted to engage any one of the notches 126. The shaft 122 is provided with a notch 127 which is moved into position to engage a pawl 128 of the selected date or month type carrier, when the shaft is laterally shifted. As the shaft 122 is rotated in a counter-clockwise direction (Fig. 9), the notch 127 engages the selected pawl 128, thereby causing the selected type carrier to be rotated. The position to which the type carrier is moved is determined by means of the pointer 121.

If any one of the type carriers 123 or 124 is to be selected for adjustment, the knob 120 is moved laterally until the proper engraving is opposite the pointer. When in the selected position, the notch 127 is opposite the pawl 128 of the selected type carrier.

Each type carrier is provided with an aligning pawl 130 (Fig. 9), which is held in engagement with an aligning wheel 131 by means of a spring 132 and holds the date printing wheels in proper alignment at all times.

The aligning pawl 130 is pivoted on a shaft 133 carried by a frame 134 secured to the before-mentioned frames 99 and 55. A guiding member 135 is provided for guiding the aligning pawls 130 in and out of engagement with the teeth of the aligning wheel 131. The guiding member 135 is secured to a flange 136, which forms a part of the frame 134.

A ratchet wheel 140 (Figs. 11 and 14) and a pawl 141 co-operating therewith, are provided to prevent turning the shaft in the wrong direction. In order to adjust the type carriers, it is necessary to turn the shaft 122 in a counter-clockwise direction (Fig. 11), and the pawl 141 engaging with the ratchet wheel 140 prevents the clockwise movement thereof. The pawl 141 is loosely pivoted on a stud 142 and is held in engagement with the ratchet wheel 140 by means of a spring 143.

*Consecutive numbering device*

The machine is provided with three consecutive number type carriers 150 (Figs. 10 and 12), for consecutively numbering the receipts as they are issued. Each of the type carriers 150 has secured to the side thereof, a ratchet wheel 151 which is adapted to be engaged by a tined carrying pawl 152 carried by a rocking frame 153. The tined pawl is held in engagement with the ratchet wheels 151 by means of a coil spring 154. The rocking frame 153 has secured thereto a stud 149 which projects through the frame 99 (Fig. 10) into a cam slot 155 (Fig. 3) cut into a link 156. The rocking frame 153 (Fig. 12), is loosely mounted on the before-mentioned shaft 122.

The link 156 (Fig. 3), is carried at its upper end on an arm 157 which forms a part of the detail paper and ribbon feeding mechanism to be later described. The lower end of the link 156 is pivoted to a rocking arm 158 pivoted on a stud 159. The rocking arm 158 is provided with a cut-away portion 162 (Fig. 20) which is engaged by a square block loose on a stud 160 mounted on an arm 161 secured to one of the key coupler stub shafts 110.

From this it can be seen that when the key coupler 109 is rocked, upon depression of a key, the arm 161 rocks the arm 158, thereby shifting the link 156 toward the right (Fig. 3), and by means of the cam slot 155 causes the rocking frame 153 to rock in a clockwise direction (Fig. 12) for advancing the consecutive numbering type carriers one step.

The consecutive numbering type carriers are each provided with an aligning pawl 130 like the aligning pawls for the date wheels. These aligning pawls are pivoted on the shaft 133 carried by the frame 134 and are guided by means of the guiding member 135. The springs 132 maintain the aligning pawls in engagement with the ratchet wheels 151 of the consecutive number type carriers.

The method of transferring from the lower to the higher order type carrier, when the lower order wheel passes from 9 to zero, is well known in the art. This type of transfer is the type in which the lowest order type carrier is provided with a notch into which the tine of the carrying pawl 152 for the lower order type carrier drops when the wheel passes from nine to zero, thereby permitting the tine of the pawl for the next higher order type carrier to engage the ratchet wheel thereon, for adding one therein. Inasmuch as this construction is well known in the art it is thought that no further description thereof is necessary.

*Consecutive number turn to zero device*

A means has been provided for turning the consecutive number type carriers to zero. The shaft 122 is provided with a notch 163 (Figs. 12 and 13) which engages pawls 164 in the well known manner. It will be noticed that the pawls 164 for the consecutive number type carriers face in the opposite direction from the pawls 128 (Fig. 9) for the date wheels. For this reason, it is necessary to rotate the shaft 122 in the opposite direction, when turning the consecutive numbering wheels to zero, from that in which it is turned when setting the date wheels. It will be remembered that the pawl 141 (Fig. 11) normally prevents this reverse rotation of the shaft 122, and therefore, means must be provided to rock the pawl 141 to its ineffective position. This means consists of a knob 176 (Figs. 11 and 14), secured to the pawl 141, by means of which the operator can rock the pawl from engagement with the ratchet wheel 140, and permitting clockwise rotation of the shaft.

A stopping device is provided to prevent rotation of the knob 120 when the consecutive number type carriers reach zero. Secured to the shaft 122 is a disk 177 which is in the same plane as a pawl 178 (Figs. 11 and 14). Also secured to the shaft 122 is a one toothed member 179 which co-operates with a trip pawl 148 for the pawl 178. When the knob 120 is rotated clockwise, the one toothed member engages the trip pawl 148 and rocks it counter-clockwise (Fig. 11). The pawl 148 is provided with a stud 147 which normally holds the pawl 178 elevated. When the pawl 148 is rocked clockwise by the movement of the knob 120, the pawl 178 is rocked counter-clockwise by a spring 146, thus rocking it into the path of a shoulder on the disk 177.

When the shoulder on the disk 177 engages the pawl 178, the knob is stopped. The shoulder is so located on the disk 177 that the knob 120 is stopped when the consecutive number type carriers reach zero.

*Detail strip*

The detail strip is fed from a supply roll 165 (Fig. 1) over two guide rollers 166 and 167, thence upward to a roller 168 to a receiving roll 169. The supply roll 165 and the receiving roll 169 are carried on the frame 99. It will be remembered that the rocking arm 158 (Fig. 3) is given one rocking movement for each operation of the machine by means of the key coupler stub shaft 110 and arm 161 (Fig. 20). This movement is transmitted to the receiving roll 169 by an arm 170, carrying a spring-pressed pawl 171 engaging a ratchet wheel 172 secured to the receiving roll 169. The arm 170 is connected to the before-mentioned arm 157 by means of a link 173.

Thus it is seen that when the rocking arm 158 is rocked clockwise (Fig. 3) the link 156 is shifted to the right, and the arm 157 is rocked in a counter-clockwise direction. This movement of the arm 157 raises the link 173, thereby rocking the arm 170 in a counter-clockwise direction to feed the detail paper.

A retaining pawl 174 (Fig. 3) is provided for preventing retrograde movement of the receiving roll 169. The retaining pawl 174 is held in engagement with the ratchet wheel 172 by means of a spring 175. The retaining pawl 174 is loosely mounted on a stud upon which the before-mentioned roller 168 is mounted.

*Ribbon mechanism*

The machine is provided with an endless ribbon which is carried through the machine between the type wheels and the printing hammers in order that an impression can be made on the detail strip and the issuing receipt. This ribbon is wound around a felt inking roller 180 (Fig. 1) and over four guide rollers 182. A weighted roller 183 maintains the proper tension on the ribbon so that the ribbon will be fed when the felt roller 180 is rotated in a manner to be presently described. The weighted roller 183 is carried by two arms 184, pivoted on a stud 185.

Secured to the end of the inking roller 180 is a ratchet wheel 186 (Fig. 3), which is engaged by a feed pawl 187 carried on an arm 188 which is formed as a part of the before-mentioned arm 157. Thus when the rocking arm 158 shifts the link 156 toward the right, as before described, the arms 157 and 188 rock in a counter-clockwise direction to feed the ribbon.

A retaining pawl 189 is provided which engages the ratchet wheel 186 and prevents retrograde movement thereof. A spring 190 maintains the pawl 187 in engagement with the ratchet wheel 186.

*Receipt feeding mechanism*

The receipt paper is fed from a supply roll 195 (Fig. 1) mounted on a stud 196 carried by the printer frame 99, over a guide stud 197 over a table 198 and between the type carriers and the receipt printing hammers to a knife blade 199. The cabinet of the machine is provided with an opening through which the paper is fed. The knife 199 is mounted on the cabinet 200, only a part of which is shown, (see Fig. 1).

Before being fed through the opening in the cabinet, the paper passes between two rollers; the feeding roller 201 and the tension roller 202, (Figs. 1, 2 and 3). The feed roller 201 is loosely mounted on a stud 203 carried by the right side frame 32 and the printer frame 99. The feed roller 201 has secured thereto a ratchet wheel 204 (see also Fig. 7), with which co-operates a feed pawl 205, pivoted on a plate 206 loosely mounted on the stud 203. A spring 207 is stretched between a stud on the pawl 205 and a stud 208 on the plate 206. The plate 206 has secured thereto a pinion 209 (Fig. 4), which meshes with teeth 210 on the before-mentioned link 156. It will be remembered that the link 156 is shifted first toward the right and then toward the left during each operation of the machine. During this movement, the teeth 210 rotate the pinion 209 in a counter-clockwise direction, thereby causing the feed pawl 205 (Fig. 7) to rotate the ratchet wheel 204 and the feed roller 201 in a counter-clockwise direction for feeding the paper forward a short distance. This feeding movement is enough to feed the forward edge of the paper out of the machine.

The tension roller 202 is carried on an arm 215 (Figs. 2 and 3). A spring 216 (see also Fig. 1) stretched between a stud on the arm 215 and a stud 217 on the frame 99 normally tends to rock the tension roller 202 into engagement with the feeding roller 201. The arm 215 is secured to a shaft 218 (Figs 2 and 3) carried by the right side frame 32 and the printer frame 99.

As will be hereinafter described, the receipt paper is pulled out of the machine manually after it has been partially fed by the rollers 201 and 202. In order to release the receipt paper so that it can be easily pulled out of the machine, the tension roller 202 is disengaged from the feed roller 201 after the feeding operation is completed. This disengagement of the tension roller is controlled by the plate 206 (Fig. 7) which has a raised portion 221, with which a stud 219 normally engages. The stud 219 is secured to an arm 220 secured to the before-mentioned shaft 218 upon which the tension roller arm 215 is secured. So long as the stud 219 is engaged with the raised portion 221 of the plate 206, the tension roller 202 is held disengaged from the feed roller.

At the beginning of an operation of the machine, the plate 206 is rocked counter-clockwise as before described, thereby rocking the raised portion 221 of the plate 206 from beneath the stud 219. The raised portion 221 is so located that the tension roller is lowered immediately after the plate 206 starts to move. The spring 216 causes the stud 219 to be lowered when the raised portion passes from beneath thereof.

A retaining pawl 225 (Fig. 7) is provided for preventing retrograde movement of the feeding roller 201. The retaining pawl 225 is loosely mounted on a stud 226 carried by the frame 99. A spring 227 stretched between a stud on the retaining pawl 225 and a stud on the frame 99 holds the retaining pawl 225 in engagement with the ratchet wheel 204.

Printing hammers

A separate hammer has been provided for taking impressions on the detail strip from the type carriers 51, another for taking the impressions on the issuing receipt from the type carriers 50, and a third for taking the impressions from the date and consecutive numbering type carriers. There is also provided two electros for printing data on the issuing receipt. As illustrated in Fig. 17, one of the electros prints "Amount of purchase shown above". The electro for printing this data is an electro 230 (Fig. 20), which is carried on a block supported by the printer plate 99 and the printer plate 55 (Fig. 1). The electro for printing the bottom line of the receipt (Fig. 17) which as illustrated is: "This is your receipt" is printed by means of the electro 231 (Fig. 20) which is carried by a block supported by the printer frames 99 and 55. Each of the electros 230 and 231 has the impression taken therefrom by means of individual platens, which are hereinafter described.

Detail strip printing hammer

The mechanism for operating the upper hammer or detail strip hammer, will be described first. The rocking arm 158 (Fig. 20) has pivoted thereon a spring-actuated pawl 232, which is guided in its movement by means of a stud 233 (see also Fig. 6). A spring 234 tends to rock the pawl 232 in a counter-clockwise direction. The pawl 232 is provided with a shoulder 235 which engages a shoulder at the lower end of an arm 236, pivoted on a stud 237, carried by the frame 99.

The arm 236 (see also Fig. 22) is secured to a yoke member having arms 238 and 239. The arm 239 is connected to the upper printer hammer 240 by means of a link 241. The hammer 240 is provided with a platen 242 which is removably mounted on the hammer 240 and is adapted to carry the inking ribbon and detail paper against the type carriers 51 for printing on the detail strip. The hammer 240 is pivoted on the before-mentioned stud 185.

When the rocking arm 158 is rocked in a clockwise direction by means of the arm 161, which is operated by the key coupler, the pawl 232 rocks the arm 236 counter-clockwise. This movement continues until the shoulder 235 passes from engagement with the lower end of the arm 236. This disengagement is accomplished due to the fact that the rocking arm 158 rocks on one center, while the arm 236 rocks on another center. This movement of the arm 236 causes the arm 239, by means of the link 241, to raise the hammer 240 in a clockwise direction upon its pivot 185.

When the pawl 232 becomes disengaged from the arm 236, a powerful spring 245 causes the arm 236 to be rocked rapidly in a clockwise direction. This rocks the yoke member, having the arms 238 and 239, rapidly in a clockwise direction, thereby lowering the link 241 and the hammer 240. The arm 239 is stopped in its clockwise movement by means of a stud 246 carried by the frame 99, which lies in the path of the arm 239. However, the hammer 240 moves on by its own momentum until it strikes the type carrier, thereby taking the impression.

The connection between the link 241 and the hammer 240 consists of a stud 247 which passes through a slot 248 in the link 241, thus permitting the hammer 240 to move independently of the link 241. The stud 247 is held in the upper end of the slot 248 by means of a spring 249 stretched between a stud 250 on the hammer and a stud carried by the printer frame 99. The spring 249 is strong enough to maintain the hammer 240 in its normal position. The spring 245, which rocks the arms 236, 238 and 239, is powerful enough to overcome the force of the spring 249 when the arms are tripped by the pawl 232. The hammer 240 is provided with a counter weight 251, which assists the hammer 240 in gaining momentum enough to take the impression from a type carrier as above described.

Receipt printing hammer

The receipt printing hammer is made up of two sections, one provided with a platen 260 for taking the impression from the electro 231, and another platen 261 for taking the impression from the date and consecutive number type carriers. The other hammer is provided with a platen 262 for taking the impression from the amount type carriers and a platen 263 for taking the impression from the electro 230. The platens 260 and 261 are removably mounted on a hammer 264 loosely mounted on the stud 237. The hammer 264 has a surface 265 which is normally held in engagement with a flange 266 on the before-mentioned arm 239, by means of gravity.

From this it can be seen that when the arm 238 is rocked rapidly in a clockwise direction by the spring 245, after the pawl 232 has tripped the arm 236, the flange 266 causes the hammer 264 to be rocked rapidly in a clockwise direction. When the arm 239 engages the stud 246, the hammer 264 has gained enough momentum to carry on to strike the electro 231 and the date and consecutive numbering type carriers. After the impression has been taken, the hammer 264 drops back, due to gravity against the flange 266.

The platens 262 and 263 are removably mounted on a hammer 270 which is similar to the hammer 264 and also rests against the flange 266 of the arm 239. It will be noticed, by referring to Fig. 22, that the flange 266 is wide enough to engage both hammers 264 and 270. From this it is apparent that when the arm 239 is rocked rapidly in a clockwise direction until it is stopped by the stud 246, the hammer 270 carries on to take the impression from the amount type carriers 50 and from the electros 230, in exactly the same manner as described for the hammer 264. Each of the hammers 264 and 270 is provided with a pawl 271 (Fig. 20) pivoted thereon. A spring 272 normally holds each pawl in position against the flange 266, as shown. The pawls 271 serves as positive connections between the flange 266 and the hammers 264 and 270, when the arm 236 is being rocked in a counter-clockwise direction by the pawl 232 and rocking arm 158, as before described.

If for any reason the hammers 264 or 270 do not follow the flange 266 when the arm 239 is rocked counter-clockwise, the flange 266 will engage the pawls 271 thereby positively rocking the hammers in the counter-clockwise direction.

In machines of the type to which this invention is shown applied, a cam 280 (Fig. 20) is usually provided for operating the printer hammer. This cam is secured to the main cam shaft 90. However, in the mechanism disclosed herein, this cam is not used for operating the hammer, inasmuch as the rocking arm 158 having the pawl 232, operates the printing hammer in a manner above described. The cam 280 is used in this machine for another purpose; namely, to assist the main cam shaft 90 to complete its first one-half rotation.

It can be seen by referring to Fig. 20 that the arm 236, which is secured to the arm 238, is operated by the pawl 232. The arm 238 is provided with an upwardly extending projection 281 which is adapted to co-operate with the cam 280 when the arm 236 is tripped by the pawl 232. The projection 281 is normally disengaged from the cam 280. However, when the arm 238 is released, a surface 283 on the cam 280 is in the path of the projection 281 of the arm 238. Thus, when the arm 238 is released, the projection 281 strikes against the surface 283 of the cam 280, thereby providing a safety means for completing the first one-half rotation of the cam shaft 90, in the event that the double rack 107 does not complete it. In this manner, the rack 107, above described, is forced to shift so that the teeth 116 engage the teeth of the pinion 105. Without the cam 280 in the machine, it would be possible, during a slow operation of the machine, to so operate it that the shaft 90 would not complete its first one-half rotation, and therefore, the rack 107 would not shift to engage the teeth 116 with the pinion 105.

By means of the projection 281 co-operating with the cam 280 as just described, this shaft is forced to complete its first one-half rotation which is enough to cause the teeth 116 to engage the pinion 105, and therefore, the machine can complete its operation.

*Automatic lock for the amount keys*

As before mentioned, in order that the amount keys are not overloaded by the receipt issuing mechanism, the mechanism is so constructed that depression of the key only partially feeds the receipt paper out of the machine. In order to make it necessary to completely pull the receipt out of the machine before another operation can be performed, an automatic lock is provided for locking the amount keys after the amount keys have been depressed.

It will be remembered that the rocking arm 158 (Fig. 3) is rocked first in a clockwise, and then in a counter-clockwise, direction each time an amount key is depressed. The lock for controlling the rocking arm 158, so that the arm cannot be operated until after the receipt has been entirely removed from the machine, is controlled by a rocking frame which is adapted to be released upon depression of an amount key. The releasing of the frame causes the frame to drop, and thereby permitting the locking members to move into position to prevent the rocking arm 158 from being again moved until the rocking frame has been restored to its normal position. The rocking frame is provided with a gripping device which will automatically grip the receipt paper after it has reached its lowest positon.

Upon pulling the receipt out of the machine manually, the frame is pulled with the paper, due to the gripping device, and therefore, the frame is restored to its normal position. When the rocking frame reaches its normal position, the lock for the rocking arm 158 is again disengaged from the rocking arm 158.

The rocking frame just mentioned, includes a pair of arms 290 and 291 (Figs. 1, 3, 8, 16 and 19). The arms are connected by means of a U shaped cross bar 292 (Fig. 19), which is adapted to hold a rubber block 293. The arms 290 and 291 are also connected by means of a sleeve 294 which makes the rocking frame of a rigid construction. The frame is loosely pivoted on a stud 295, carried by the frame 99. The frame is held in its normal position as shown in Fig. 3, by means of a half-round stud 296 secured to an arm 297 loosely mounted on a stud 298 carried by the frame 99. The arm 297 is held in its normal position by means of a spring 301, and is limited in its movement by the engagement of the stud 296 with the left-hand end of a slot 308 (Fig. 1) cut in the frame 99. The arm 290 of the rocking frame is provided with a stud 302 (Figs. 3 and 8) which normally rests on the stud 296.

A pawl 300 is mounted on the before-mentioned stud 233 (Fig. 6), and is provided with a lug 304 (Fig. 5), which projects into a notch cut into a collar 305, secured on the stud 233. The pawl 300 is held in its normal position with the lug 304 in engagement with the right hand end of the notch in the collar 305, by means of a spring 306 (Figs. 5 and 6) which is stretched between a stud on the pawl 300 and a stud 307 carried by the arm 158.

From this construction it can be seen that when the arm 158 is rocked about its pivot 159 in a clockwise direction, the upper end of the pawl 300 being in engagement with the arm 297, causes the pawl 300 to rock in a counter-clockwise direction due to the freedom of the lug 304 to move in the notch of the collar 305. During the return movement of the arm 158, the pawl 300 strikes the under side of the arm 297 and thereby tends to rotate the pawl 300 in a clockwise direction. At this time the pawl 300 cannot rotate because the lug 304 is in engagement with the right hand end of the notch in the collar 305, and therefore, the pawl 300 cams the arm 297 in a clockwise direction, thereby moving the half-round stud 296 from beneath the stud 302 on the rocking frame. When the stud 296 is thus removed, the frame is free to drop, due to gravity, until a foot 310 (Fig. 3) of the arm 290 engages a stud 311 carried by the frame 99. The stud 311 thus forms a stop for the rocking frame when the frame is released.

Also mounted on the stud 295 is an arm 313 (Figs. 3 and 8) which, together with the arm 290, carry a stud 314. Pivoted on the stud 314 is a forwardly extending pawl 315 which is normally engaged by a stud 316 on the locking member 317. The pawl 315 normally holds the locking member 317 in the position shown in Fig. 3, in which position it does not engage the arm 158. A spring 318 normally tends to rotate the locking member 317 in the direction into the path of the rocking arm 158. However, the pawl 315 prevents this movement of the locking member 317 until after the rocking frame has been released as just described. When the rocking frame falls, the arm 313 is carried toward the right (Fig. 3) thereby permitting the spring 318 to rock the locking member 317 into the path of the arm 158.

When the locking member 317 is in the path of the rocking arm 158, it is impossible to depress an amount key because the rocking frame 158 cannot be rocked by the arm 161 secured to the key coupler stub shaft 110, before described.

Therefore, the entire accumulating mechanism is locked and nothing can be added into the totalizer.

*Receipt paper gripping device*

As before mentioned, a gripping device is provided which connects the rocking frame to the receipt paper before the receipt paper is manually pulled out of the machine. At the end of the operation of the machine and after the paper has been removed, this gripping device is still connected to the receipt paper. A mechanism is provided for releasing this gripping device from the receipt paper before the rocking frame is released and permitted to drop.

The gripping device includes a pair of links 325 (Figs. 1, 3, 8, 16 and 19), which are spaced apart on a stud 327 by means of a sleeve 326, supported by a pair of arms 328 secured to a shaft 329. The shaft 329 is journaled in the arms 290 and 291. The rear arm 328 is provided with a downwardly extending lug or foot 330 (Fig. 18), which is engaged by a spring-drawn pawl 331 pivoted on the arm 290. A spring 332 stretched between a stud on the pawl 331, and a stud 333 on the arm 290, causes the pawl 331 to rock in a clockwise direction until stopped by the foot 330 of the rear arm 328. The links 325 are also connected at their upper end by means of a rod 334, upon which a spacing sleeve 335 is loosely mounted. The rod 334 projects into guiding slots 339 (Figs. 1 and 16), in the arms 290 and 291. A U-shaped bar 336 is formed and made integral with the link 325, in which is supported a rubber block 337. The block 337 is normally held in position to grip the receipt paper between it and the rubber block 293 of the rocking frame by means of two springs 338.

When the rocking arm 158 receives its initial or clockwise movement, the before-mentioned stud 233 engages the rear arm 328 (Fig. 18) thereby rocking both arms 328 in a clockwise direction, to permit the pawl 331 to rock into engagement with the forward edge of the foot 330, thus holding the arms 328 together with the links 325 and the rubber block 337 disengaged from the receipt paper and the block 293. After the pawl 331 is rocked to its effective position to hold the arm 328 and the rubber block 337 away from the receipt paper and block 293, the pawl 300 rocks the arm 297 into its ineffective position, thereby releasing the rocking frame. From this it can be seen that when the frame is released, the gripping device is released from the receipt paper, thus permitting the free movement of the rocking frame without effecting the receipt paper.

The pawl 331 engages the stud 311 (Fig. 3) when the rocking frame falls to its lowermost position. When the pawl 331 engages the stud 311, the pawl is rocked in a counter-clockwise direction against the tension of the spring 332 (Fig. 19), thereby disconnecting the pawl from the arm 328 and permitting the springs 338 to again raise the links 325 so that the rubber block 337 again engages the receipt paper and the rubber block 293. It should be remembered that the receipt paper is fed between the blocks 337 and 293. Thus, it is seen that after the rocking frame is lowered and the amount keys are locked, the rubber block 337 is permitted to move forward to grip the paper between the block 337 and the block 293.

When in this position, the receipt paper is partially fed out of the machine, as before described. Before an amount key can again be depressed, it is necessary for the operator to grasp the partially issued receipt and pull it out of the machine manually. When thus pulling out the partially issued receipt from the machine, the rocking frame being connected to the receipt paper by means of the gripping device just described, pulls the rocking frame therewith, until the pawl 315 (Fig. 3) has again removed the locking member 317 out of the path of the rocking arm 158. A stud 344 on the frame 99 in the path of a surface 343 on the arm 290 determines the movement of the frame 290—291, thus determining the manual feed of the receipt. When the rocking frame reaches this position in the lock 317 is disengaged from the rocking arm 158, and the stud 302 on the arm 290 is above the stud 296 (Fig. 3), of the arm 297, thus permitting the spring 301 to again rock the stud 296 beneath the stud 302, thereby holding the rocking frame in its upper position, thereby permitting the amount keys to be depressed to perform another accumulating operation.

It is possible to tear off the receipt paper before the rocking frame has reached its unlocking position, and before the amount keys are unlocked. If this should occur, then it would be impossible to operate the amount keys again unless the cabinet is opened and the rocking frame 291 is manually moved to its upper position. In order to assist the operator to restore the rocking frame to its unlocking position, in the event the paper is accidentally torn off before the rocking frame has reached its unlocking position, a special device has been provided.

A lever 345 (Fig. 16), which is located on the outside of the cabinet door 346 is provided, and is secured to a stud 347 mounted in the cabinet door 346. Also secured to the shaft 347 is an arm 348 which is within the cabinet of the machine. The arm 348 is normally held in engagement with a stud 349 by means of a spring 350 stretched between a stud on the arm 348 and a stud on the cabinet door 346. The arm 348 is provided with a stud 351 which projects into the path of the rocking frame arm 291.

If the rocking frame is in a locking position, the frame can be shifted to its unlocking position by depressing the lever 345 which rocks the arm 348 in an upward direction, thereby causing the rocking frame to be raised by the engagement of the stud 351 on the arm 348 with the arm 291 of the rocking frame. Thus the rocking frame can be raised to its unlocking position by means of the manually operable lever 345.

*"On" and "off" knob*

The machine is provided with an "on" and "off" knob, by means of which the receipt issuing mechanism can be rendered ineffective. A knob 360 (Figs. 21 and 23) is carried by a disk 361 secured to a shaft 362 carried by the frame 99. The disk 361 is provided with a stud 363 which lies in the path of a downwardly projecting portion 364 (Fig. 20) on the beforementioned pawl 271 carried by the printing hammers 264 and 270. When the knob is in the position shown in Fig. 20, the mechanism is set for issuing a receipt. When it is desired to render the receipt issuing mechanism ineffective, the knob 360 is turned in a counter-clockwise direction until the stud 363 engages the downwardly projecting portion 364, thereby rocking the pawls 271 out of the path of the flange 266.

The downwardly projecting portion 364 is so formed that when the disk 361 is moved to its extreme counter-clockwise position, the stud 363 rests in a notch 365 in the pawls 271, thus holding the hammers 264 and 270 in their elevated positions. When in this position and the machine is operated, the arm 236, together with the yoked member having arms 238 and 239, will receive an idle operation because the receipt-printing hammers are held against movement.

The "on" and "off" knob is also adapted to render the receipt paper tension roller ineffective, that is, it will hold the tension roller in its ineffective position. Secured to the shaft 362 (Fig. 3) is an arm 367 provided with a forwardly projecting stud 368 which lies in the plane of a link 369 carried by two studs 370 and 371. When the "on" and "off" knob 360 is rocked thereby rocking the shaft 362, the stud 368 rocks against the lower edge 372 of the link 369, thereby raising the link. The upper end of the link 369 is provided with a surface 373 which is adapted to engage the before-mentioned stud 219 on the arm 220 and rock it upward or in a counter-clockwise direction. This movement of the link 369 maintains the arm 215 in its upper position, and therefore, when the link 156 is operated and the feed roller 201 is rotated, the paper is not fed because the tension roller is held from engaging the feed roller.

It is also important that the locking member 317 is held out of the path of the rocking arm 158 so that the amount keys can be operated for entering successive amounts.

The before-mentioned stud 368 is long enough to not only project into the plane of the link 369 but also into the plane of the arm 313 (Fig. 3). When the knob is set to its "off" position, the stud 368 is moved into the path of the arm 313, thereby preventing the rocking frame and the pawl 315 from moving to permit the locking member 317 to engage the rocking arm 158. Therefore, when the knob is set in the "off" position, the rocking arm 158 is free to move and the machine can be operated for successive operations without issuing a receipt.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:—

1. In a machine of the class described, the combination of accumulating mechanism, record material feeding mechanism for feeding the end of the record material into position to be pulled out of the machine manually, locking means for the accumulating mechanism adapted to become effective after the accumulating mechanism is operated, and means for gripping the record material and operated thereby when the record material is pulled out of the machine manually for releasing said locking means.

2. In a machine of the class described, the combination of accumulating mechanism, record material feeding mechanism for feeding the end of the record material into position to be pulled out of the machine manually, locking means for the accumulating mechanism adapted to become effective after the accumulating mechanism is operated, a gripping device adapted to grip the record material, and means intermediate the gripping device and the locking means for releasing the locking means, when the record material is pulled out of the machine, to unlock the accumulating mechanism.

3. In a machine of the class described, the combination of accumulating mechanism, record material feeding mechanism for feeding the end of the record material into position to be pulled out of the machine manually, locking means for the accumulating mechanism adapted to become effective after the accumulating mechanism is operated, a gripping device adapted to grip the record material, and means intermediate the gripping device and the locking means for releasing the locking means when the record material is pulled out of the machine, to unlock the accumulating mechanism and a member operated during the operation of the accumulating mechanism for rendering the gripping device ineffective.

4. In a machine of the class described, the combination of accumulating mechanism, record material feeding mechanism for feeding the end of the record material into position to be pulled out of the machine manually, locking means for the accumulating mechanism adapted to become effective after the accumulating mechanism is operated, means for releasing said locking means, a gripping device for connecting the means for releasing the locking means with the record material whereby the accumulating mechanism is unlocked when the record material is pulled out of the machine manually, a member operated during the operation of the accumulating mechanism for rendering the gripping device ineffective, latching means for latching the means for releasing said locking means in normal position, and a trip for unlocking said latching means subsequent to the operation of said member.

5. In a machine of the class described, the combination of an accumulating mechanism, locking means for said accumulating mechanism, record material movable into position to be pulled out of the machine, a gripping device adapted to grip said record material and to be moved by said record material into a certain position when the record material is pulled out of the machine, means to latch the gripping device in such moved position, and connections from said gripping device to said locking means for maintaining the locking means in its unlocked position after the gripping device has been latched in the moved position.

6. In a machine of the class described, the combination of an accumulating mechanism, locking means for said accumulating mechanism, record material movable into position to be pulled out of the machine, a gripping device adapted to grip said record material and to be moved by said record material into a certain position when the record material is pulled out of the machine, means to latch the gripping device in such moved position, connections from said gripping device to said locking means for maintaining the locking means in the unlocked position after the gripping device has been latched in the moved position, and means for releasing the gripping device from the record material upon operation of the accumulating mechanism.

7. In a machine of the class described, the combination of an accumulating mechanism, locking means for said accumulating mechanism, record material movable into position to be pulled out of the machine, a gripping device adapted to grip said record material and to be moved by said record material into a certain position when the record material is pulled out of the machine, a latch for latching the gripping device in its moved position, connections from said gripping device to said locking means for maintaining the locking means in its unlocked position after the gripping device has been moved by the record material, and a member operated by the accumulating mechanism for unlatching the gripping device, thereby permitting the gripping device to be moved to its effective position for locking the accumulating mechanism.

8. In a machine of the class described, the combination of an accumulating mechanism, locking means for said accumulating mechanism, record material movable into position to be pulled out of the machine, a gripping device adapted to grip said record material and to be moved by said record material into a certain position when the record material is pulled out of the machine, a latch for latching the gripping device in its moved position, connections from said gripping device to said locking means for maintaining the locking means in its unlocked position after the gripping device has been moved by the record material, means for releasing the gripping device from the record material upon operation of the accumulating mechanism, a member operated during the operation of the accumulating mechanism for unlatching the gripping device, thereby permitting the gripping device to be moved to its effective position for locking the accumulating mechanism, a stop for limiting the movement of the gripping device when unlatched by the said member, and a trip on said gripping device to release the gripping device to again grip the paper when said gripping device engages said stop.

9. In a record material issuing mechanism, a pivoted frame, a slidable frame mounted on the pivoted frame, a gripping element mounted on each frame adapted to cooperate with each other to grip the record material, means to feed the record material between the gripping elements, and means to actuate the slidable frame to grip the paper.

10. In a machine of the class described, the combination of a pivoted frame, a slidable frame mounted on the pivoted frame, a gripping element mounted on each frame adapted to cooperate with record material, feed means to feed the record material between the gripping elements, a key operated frame to actuate the feed means, a means to prevent operation of the key operated feed means after an operation thereof has been completed, means to actuate the slidable frame to grip the record material after the key operated feed means completes its operation, and means on the pivoted frame to release the key operated frame upon subsequent manual actuation of the pivoted frame.

11. In a machine of the class described, the combination of a pivoted frame, a slidable frame mounted on the pivoted frame, a gripping element mounted on each frame adapted to cooperate with record material, feed means to feed the record material between the gripping elements, a key operated frame to actuate the feed means, a means to prevent operation of the key operated feed means after an operation thereof has been completed, means to actuate the slidable frame to grip the record material after the key operated feed means completes its operation, means to limit the extent of movement of the pivoted frame upon a subsequent operation thereof, and means on the pivoted frame to release the key operated frame as the pivoted frame reaches the limit of its movement.

12. In a machine of the class described; the combination of a freely mounted unbalanced frame, a latch to maintain the frame in its normal position, a key operated feed means for the record material, a trip device to rock the latch to its ineffective position to release the frame to the action of gravity, a slidable frame, a gripping element on each frame adapted to normally grip the record material, means actuated by the key operated means to slide the slidable frame to release its grip on the record material before the first mentioned frame is released to the action of gravity, a device to maintain the slidable frame in the last named position, and a stop to limit the movement of the first mentioned frame, said stop cooperating with the device to release the slidable frame to renew its grip on the record material.

13. In a machine of the class described, the combination of a rockable frame adapted to grip record material; record material feed means; means to lock the record material feed means after the record material has been fed a certain distance; and means, actuated by the frame when the record material is otherwise fed an additional distance, to unlock the feed means for subsequent operations.

14. In a machine of the class described, the combination of record material feed mechanism to feed the record material a certain distance, means to lock the feed mechanism after said certain feed has been completed, a rocking frame adapted to grip the record material when said certain feed has been completed and adapted to be rocked by the record material when the record material is otherwise operated to complete its feed; a pivoted pawl on said frame cooperating with the lock to control its effectivity, said pivoted pawl adapted to unlock he feed mechanism when the rocking frame is operated by the record material when its second feed is completed.

15. In a machine of the class described, the combination of record material feed mechanism to feed the record material a certain distance into a position to be fed manually an additional step, a pivoted rock arm to actuate the feed mechanism said certain distance, a locking device movable into the path of the pivoted rock arm after said feed mechanism has fed the record material said certain distance to lock the feed mechanism, means to remove the locking device from the path of the pivoted rock arm after the record material has been fed manually an additional step, and a manipulative device to render the feeding mechanism inactive and simultaneously rendering the locking device inactive.

16. In a machine of the class described, the combination of a feed mechanism, a rockable frame, a gripping means on the frame adapted to grip the record material, the frame adapted to be subsequently rocked by the record material, a locking arm to lock the feed mechanism, a projection on the locking arm, a pivoted pawl on the rocking frame constantly engaging the projection, said pawl being movable with the rockable frame to release the locking arm when the frame moves to one of its positions, and a manipulative device to render the feed mechanism inactive and to maintain the rockable frame in its normal position to maintain the locking arm in its ineffective position.

17. In a machine of the class described, the combination of a feed mechanism, a rockable frame, a gripping means on the frame adapted to grip the record material, the frame adapted to be subsequently rocked by the record material, a locking arm to lock the feed mechanism, a projection on the locking arm, a pivoted pawl on the rocking frame constantly engaging the projection, said pawl being movable with the rockable frame to release the locking arm when the frame moves to one of its positions, a manipulative device to render the feed mechanism inactive, and an element settable by the manipulative device to engage the pivoted pawl to thereby maintain the locking arm in its unlocking position when the feed mechanism is inactive.

18. In a machine of the class described, the combination of accumulating mechanism; means to feed record material from an inaccessible position into an accessible position for a manual feeding operation of the record material; means to lock the accumulating mechanism after the record material becomes accessible; and means for gripping the record material when the record material becomes accessible, said gripping means being operated by the record material upon the manual operation thereof, to release the accumulating mchanism lock.

19. In a machine of the class described, the combination of means to render record material accessible for a manual feeding operation; means to lock an element of the machine after the record material has been rendered accessible; and means for gripping the record material when the record material becomes accessible, said gripping means being operated by the record material upon the manual operation of the record material to release the lock for the element.

20. In a record material issuing mechanism, a pivoted frame, a slidable frame mounted on the pivoted frame, a gripping element mounted on each frame arranged to cooperate with each other to grip the record material thus connecting the record material to the pivoted frame, means to feed the record material into position to be gripped by the gripping elements and into position for a manual feed of the record material after the gripping elements become effective, and means to determine the extent of manual movements of the record material and the pivoted frame.

21. In a key-operated machine of the class described, a receipt-issuing mechanism; keys to operate the receipt-issuing mechanism; means, included in the receipt-issuing mechanism, to feed the receipt a fraction of its length into position to be subsequently fed manually, and means to determine the length of the subsequent manual feed of the receipt.

22. In a key-operated machine of the class described; a receipt-issuing mechanism; keys to operate the receipt-issuing mechanism; means, included in the receipt-issuing mechanism, to feed the receipt a fraction of its length; means to determine the length of a subsequent manual feed of the receipt; means, controlled by the feed, to lock the keys after the receipt is in the automatically fed position; and means to unlock the keys after the manual feed has been completed.

23. In a key-operated machine of the class described; a receipt-issuing mechanism; keys to operate the receipt-issuing mechanism; means, included in the receipt-issuing mechanism, to feed the receipt a fraction of its length; and a rockable frame movable with the receipt to limit the extent of a subsequent manual movement of the receipt.

24. In a receipt issuing mechanism, the combination of mechanical means to feed a receipt into position to be fed mechanically, and means controlled by the mechanical means to determine the length of a manual feed of the receipt.

25. In a receipt issuing machine, the combination of mechanism to feed the free end of a receipt from an inaccessible position to an accessible position from which position the receipt may be fed manually, and means released by said mechanism to limit the manual feed of the receipt.

CHARLES L. LEE.

CERTIFICATE OF CORRECTION.

Patent No. 1,989,323.  January 29, 1935.

CHARLES L. LEE.

It is hereby certified that error appears in the printed specification of the above numbered patent requiring correction as follows: Page 10, second column, line 30, claim 14, for "he" read the; and page 11, second column, line 29, claim 24, for "mechanically" read manually; and that the said Letters Patent should be read with these corrections therein that the same may conform to the record of the case in the Patent Office.

Signed and sealed this 12th day of March, A. D. 1935.

Leslie Frazer (Seal) Acting Commissioner of Patents.